Jan. 21, 1958   S. DULUK ET AL   2,820,506
VEHICLE SEAT
Filed Jan. 26, 1956   4 Sheets-Sheet 1
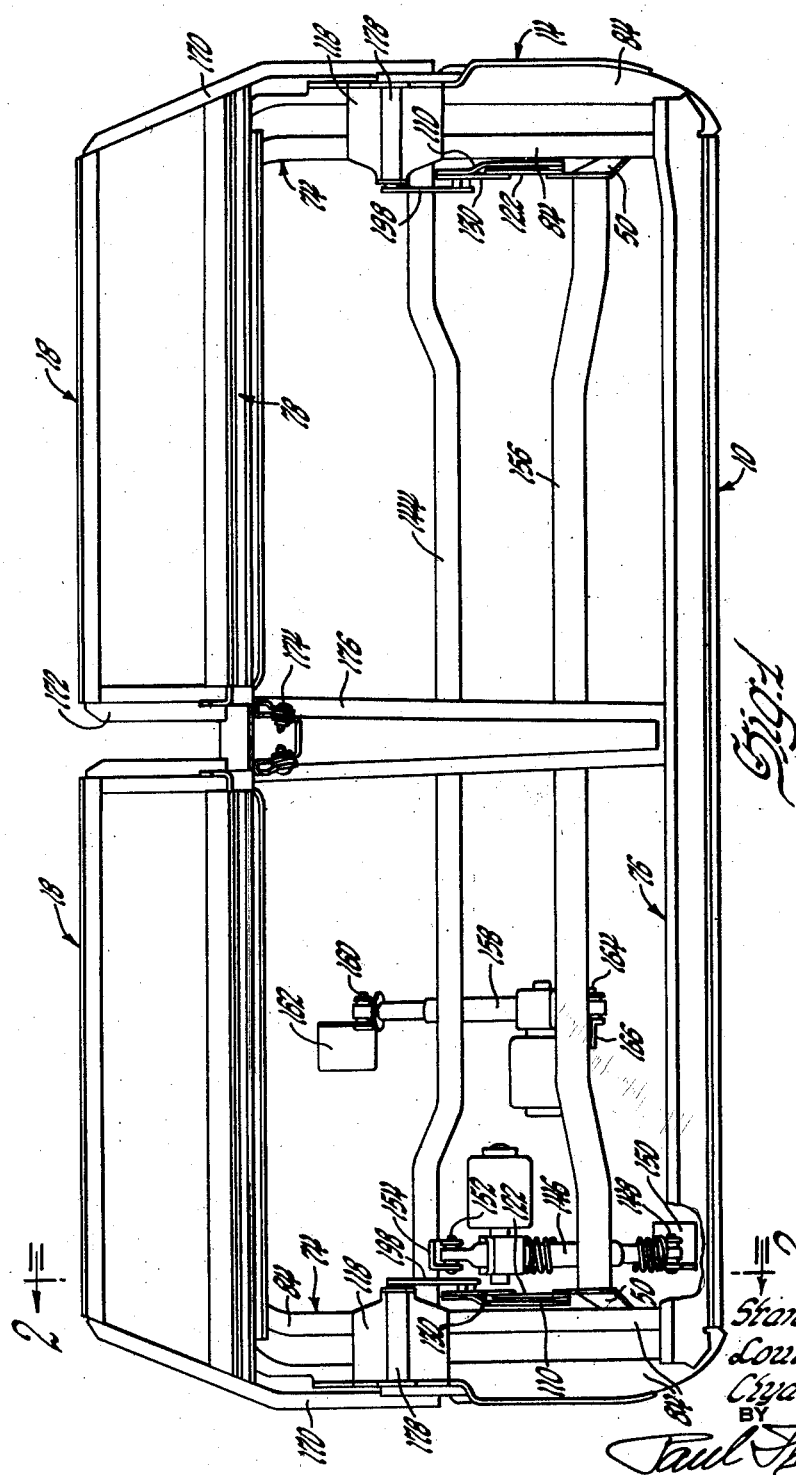
INVENTORS
Stanley Duluk,
Louis P. Garvey, &
Clyde H. Schomer
BY
Paul Fitzpatrick
ATTORNEY

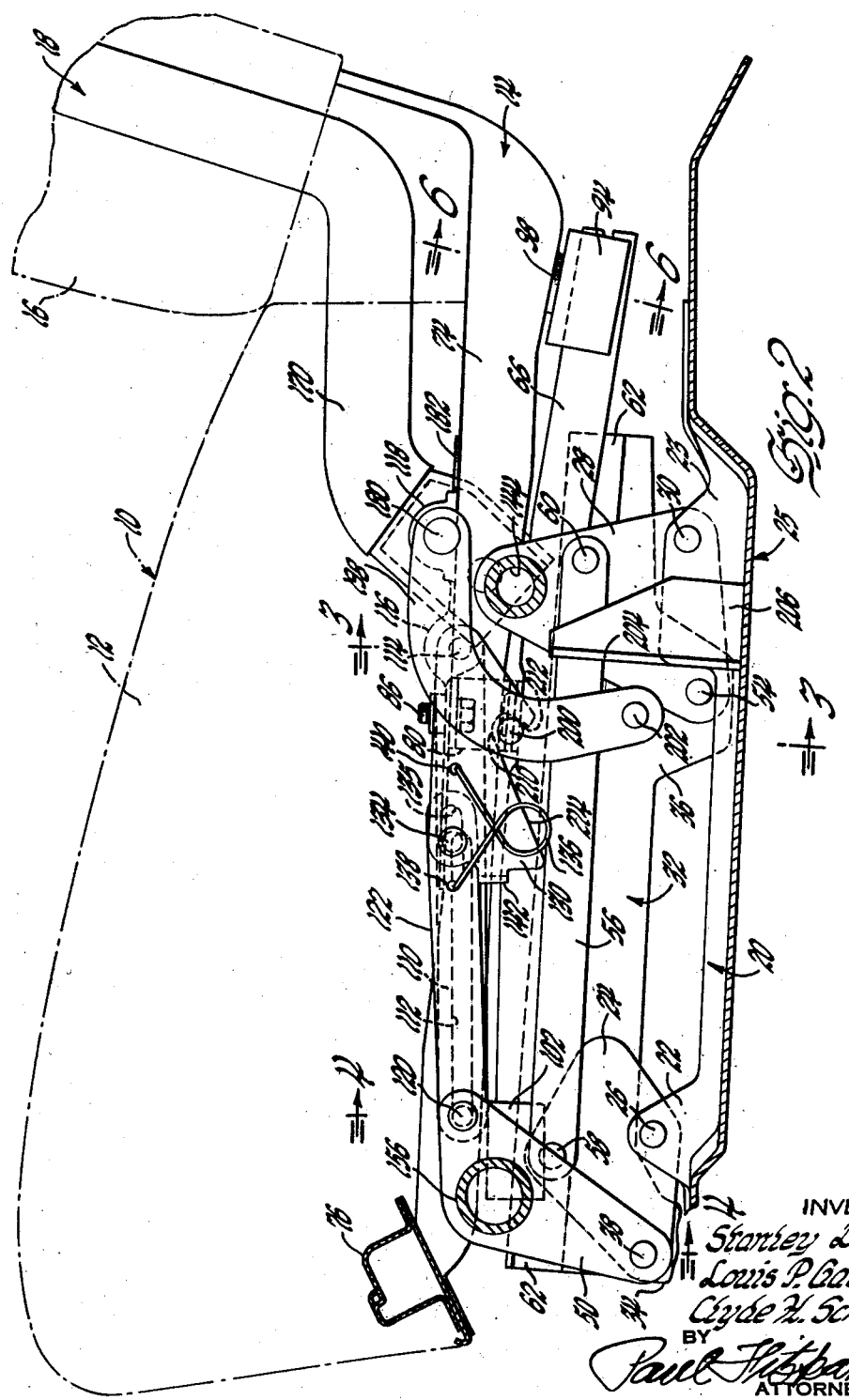

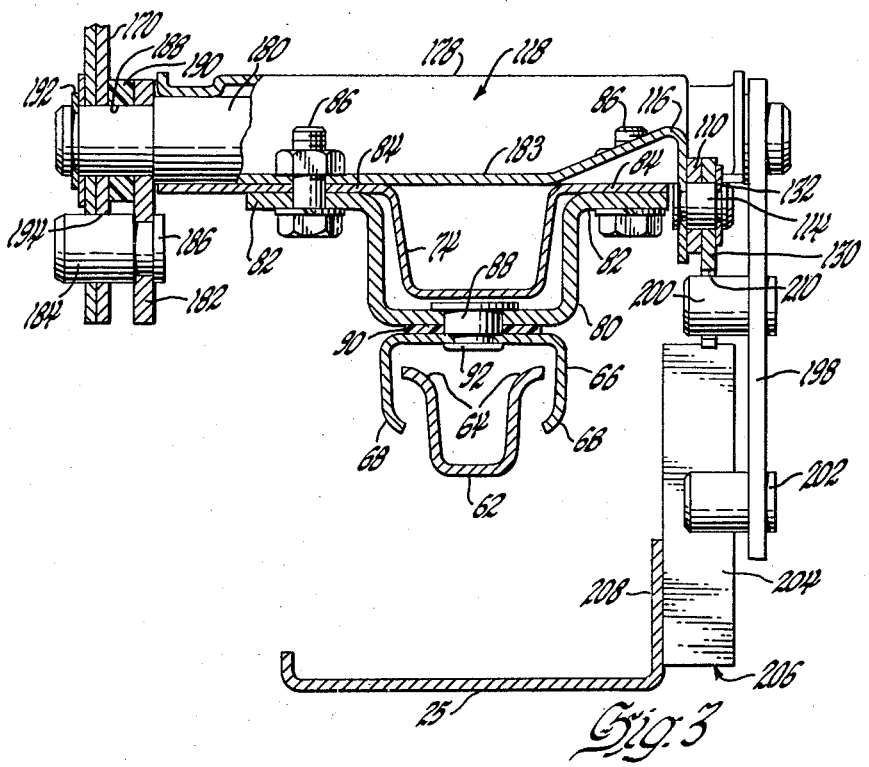
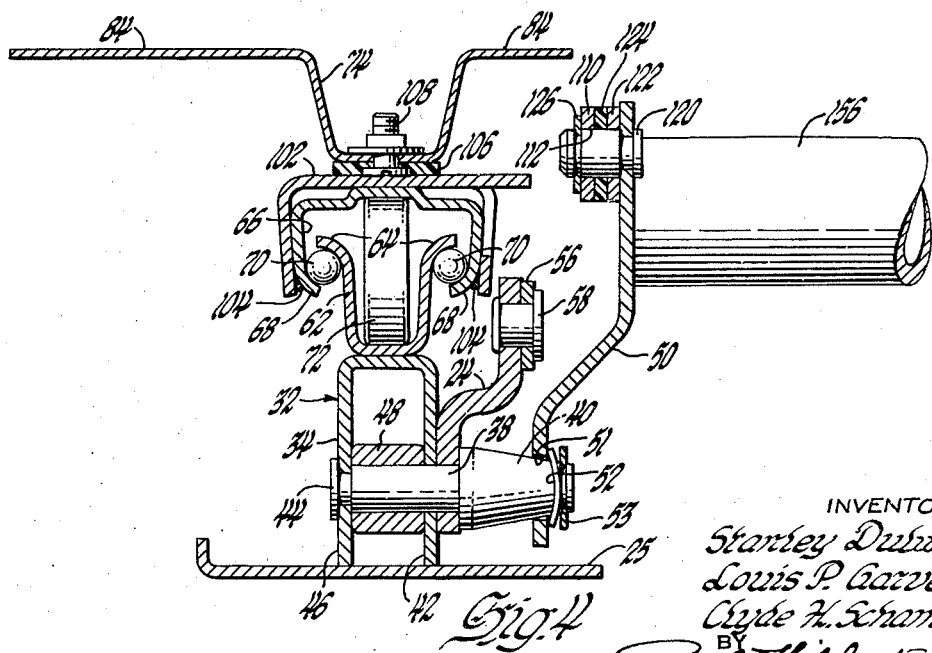

Jan. 21, 1958
S. DULUK ET AL
2,820,506
VEHICLE SEAT
Filed Jan. 26, 1956
4 Sheets-Sheet 4
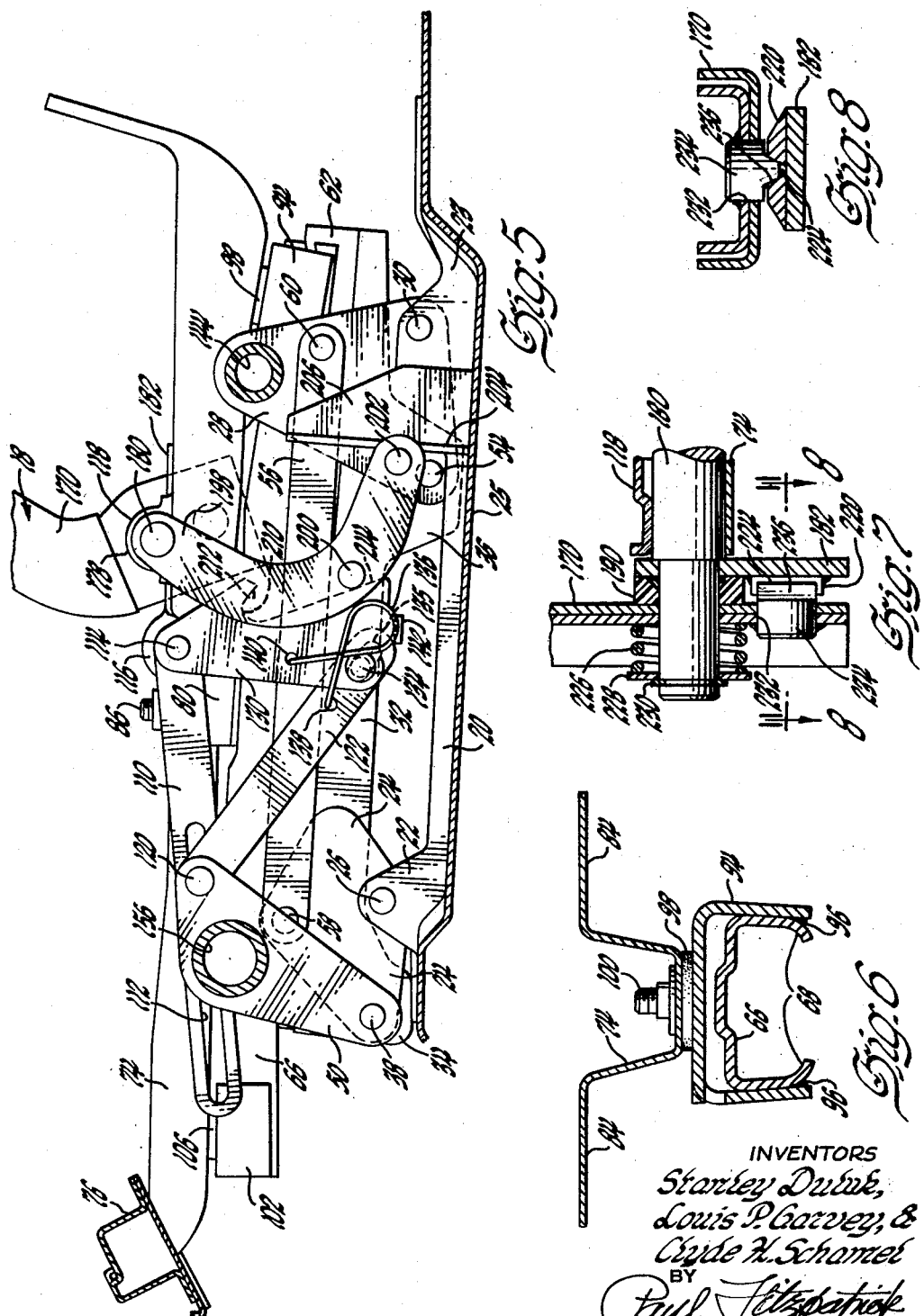
INVENTORS
Stanley Duluk,
Louis P. Garvey, &
Clyde H. Schamel
BY
Paul Fitzpatrick
ATTORNEY United States Patent Office 2,820,506
Patented Jan. 21, 1958

2,820,506

VEHICLE SEAT

Stanley Duluk, Dearborn, Louis P. Garvey, Detroit, and Clyde H. Schamel, Royal Oak, Mich., assignors to General Motors Corporation, Detroit, Mich., a corporation of Delaware Application January 26, 1956, Serial No. 561,477

8 Claims. (Cl. 155—14)

This invention relates to vehicle seats and more particularly to vehicle seats adapted to be bodily displaced in response to tilting movement of a seat back.

It is well known in the art to provide the front seats of two-door vehicles with tilting seat backs wherein tilting movement of either one or both seat backs moves the seat forwardly to a temporarily displaced position. This increases the clearance space between the seat and the adjacent door jamb in order to facilitate the entrance and exit of rear seat passengers. These seats have been commonly known as "easy entrance seats."

This invention, in its preferred embodiment, provides a front seat which is both horizontally and vertically adjustable and which also includes an easy entrance feature to provide for temporary horizontal displacement of the entire seat or of one side thereof in order to facilitate entrance and exit of rear seat passengers. The seat includes the easy entrance feature on both sides thereof allowing either side of the seat to be temporarily displaced or allowing the entire seat to be so displaced. The easy entrance feature is of relatively simple construction and can be applied to existing seat adjuster mechanisms without extensive modification.

An object of this invention is to provide a vehicle front seat which is adapted to be bodily displaced in response to tilting movement of a seat back. Another object of this invention is to provide a vehicle front seat which is both horizontally and vertically adjustable and which is adapted to be bodily displaced in response to tilting movement of a seat back. A further object of this invention is to provide a vehicle front seat which is horizontally adjustable and which is adapted to be bodily displaced in response to tilting movement of either of a pair of seat backs carried by the seat.

These and other objects of this invention will be readily apparent from the following specification and drawings, wherein:

Figure 1 is a plan view of a vehicle front seat embodying an easy entrance feature according to this invention at each side thereof;

Figure 2 is a sectional plan view on the plane indicated by line 2—2 of Figure 1;

Figure 3 is a sectional view on the plane indicated by line 3—3 of Figure 2;

Figure 4 is a sectional view on the plane indicated by line 4—4 of Figure 2;

Figure 5 is a view similar to Figure 2 showing one side of the seat temporarily displaced upon tilting movement of one of the seat backs;

Figure 6 is a sectional view on the plane indicated by line 6—6 of Figure 2;

Figure 7 is a view of a modified clutch arrangement between the seat back supporting arm and the easy entrance feature; and Figure 8 is a sectional view on line 8—8 of Figure 7.

Referring now to Figures 1 and 2 of the drawings, a vehicle front seat 10 includes a seat cushion 12 mounted on a base frame 14, and a pair of back cushions 16 mounted on a pair of back frames 18 pivotally supported on the base frame as will be described. The base frame is supported on either side thereof for both horizontal and vertical adjustment by seat adjuster mechanism which incorporates an easy entrance feature according to this invention. Since the seat adjuster mechanism is the same on both sides of the seat, only one such adjuster mechanism will now be described.

A bracket 20 having forward and rearward upright ears 22 and 23 is secured to the vehicle floor pan 25 in a suitable manner. An offset trapezoidal shaped plate 24 is pivotally mounted on the forward ear 22 at 26, and an offset triangular shaped plate 28 is pivotally mounted on the rearward ear 23 at 30. A channel shaped seat support bracket 32 includes forward and rearward depending ears 34 and 36. Referring now particularly to Figure 4 of the drawings, a shouldered stud 38 extends between the walls of ear 34 and includes a tapered portion 40. Plate 24 is rotatably mounted on stud 38 in engagement with the inner wall 42 of ear 34 and the base of tapered portion 40. After assembly of the plate on the stud, the end portion 44 of the stud is peened over against the outer wall 46 of ear 34 to rigidly secure the stud to the ear. A bushing 48 is provided between the inner and outer walls of the ear on stud 38 in order to prevent bending of the walls.

An offset bracket 50 is apertured at 51 at one end thereof and is rotatably journalled on tapered portion 40 of stud 38. A concave spring washer 52 is also journalled on tapered portion 40 in engagement with bracket 50, and the bracket and washer are retained in place by a retaining ring 53. The spring washer 52 and tapered portion 40 of stud 38 operate to take up any lateral thrusts imposed on bracket 50 since the spring washer constantly urges the bracket toward the larger diameter end of tapered portion 40 and resists movement of the bracket toward the smaller diameter end of the tapered portion.

The triangular shaped plate 28 is pivotally secured to the rearward depending ear 36 of bracket 32 at 54, and plates 24 and 28 are pivotally interconnected by a shiftable link 56 pivoted to plate 24 at 58 and to plate 28 at 60. Thus, movement of plate 28 about pivot 30 in a clockwise direction operates to lift the rearward portion of bracket 32 by means of pivot 54 and also operates to shift plate 24 in a clockwise direction about pivot 26 by means of link 56 to cause plate 24 to lift the forward portion of bracket 32 by means of pivot 38. Likewise, movement of plate 28 in a counterclockwise direction about pivot 30 operates to lower the rear portion of bracket 32 and also operates to move plate 24 counterclockwise about its pivotal support 26 by means of link 56 to lower the forward portion of bracket 32. The seat support bracket 32 is thus supported on the vehicle floor pan for vertical movement relative thereto upon swinging movement of both plates 24 and 28.

A lower track member 62 is secured to the upper edge of bracket 32 in a suitable manner and includes arcuate offset flanges 64. An upper track member 66 includes arcuate offset flanges 68 and is slidably mounted on the lower track member by means of a number of ball bearings 70 which are received between the arcuate flanges of each track member and a number of circular rollers 72 which bear against the base of each track member and retain the arcuate flanges thereof in engagement with the ball bearings 70. Thus, the upper track member is slidably mounted on the lower track member for easy and smooth movement relative thereto by means of the rollers and ball bearings.

Referring now particularly to Figure 1 of the drawings, the base frame 14 includes a pair of channel side members 74 joined by a forward channel member 76 and rear channel member 78 to define a rectangular rigid frame. Intermediate the ends of the channel side members, a U-shaped bracket 80 encircles the members and includes flanges 82 which are bolted to the flanges 84 of the channel side members at 86. A shouldered stud 88 extends through aligned apertures in the base of bracket 80 and the upper wall of track member 66 to rotatably secure each side of the seat frame to a respective track member 66. A nylon washer 90 fits between the base of bracket 80 and the upper surface of track member 66 to prevent wear between these members, and the end 92 of stud 88 is peened over after assembly to rigidly secure the stud to the upper track member 66. In the arrangement shown, the pivots 88 are transversely aligned with each other, although they may be otherwise as will be hereinafter described.

Referring now to Figures 2, 4, and 6 of the drawings, a U-shaped bracket 94 encircles the upper track member adjacent the rear of the seat, and the legs of the bracket are welded to the legs of the upper track member at 96. A nylon pad 98 fits between the base of the channel side member 74 and the upper surface of bracket 94 and is bolted at 100 to the base of channel side member 74. A bracket 102 similar to bracket 94 encircles the upper track member 66 adjacent the forward end of the seat and is welded to the upper track member at 104. A nylon washer 106 fits between the base of channel side member 74 and the upper surface of bracket 102 and is bolted at 108 to the channel side member 74. Thus, each side of the seat frame is pivotally secured to an upper track member intermediate the ends thereof and is also slidably supported on the track member adjacent each end thereof by means of a resilient pad to allow relative swinging movement between the channel side members and the upper track members about their pivotal connections 88.

Referring now to Figures 2 through 5 of the drawings, a link 110 includes a slot 112 at one end thereof and the other end of the link is rotatably mounted on a stud 114 fixed to an offset portion 116 of housing 118. The upper end of bracket 50 mounts a stud 120, shown particularly in Figure 4, and slot 112 of link 110 is rotatably and slidably mounted on this stud. A link 122 is also rotatably mounted on stud 120 at one end thereof, and a nylon washer 124 is positioned between links 110 and 122 with the entire assembly being rotatably secured in place on the stud by means of a retaining ring 126. A plate member 130 is rotatably mounted on stud 114 coaxially with link 110 as shown in Figure 3 and both the link and plate retained in place on stud 114 by means of a retaining ring 132. The opposite end of plate 130 mounts a stud 134 which slidably and rotatably receives a slot 135 at the other end of link 122 to provide a toggle linkage connection between studs 114 and 120 which includes a lost motion connection provided by slot 135 and stud 134. A hairpin spring 136 has one end 138 thereof secured to link 122 and the other end 140 thereof secured to plate 130 in order to normally hold the pivotal connection between the link and the plate above a line through the centers of studs 114 and 120. Plate 130 includes a laterally outwardly extending lug portion 142 which engages the lower edge of link 122 in the position shown in Figure 2 to aid spring 136 in normally holding the pivotal connection between the link and the plate above a line through the centers of studs 114 and 120.

As shown in Figure 1 of the drawings, a vertical torque rod 144 spans the seat transversely thereof and is welded at its ends to each of the triangular plates 28. A motor driven screw jack 146 has one end thereof pivotally secured at 148 to an offset bracket 150 secured to the vehicle floor pan 25. The other end of the screw jack is pivotally secured at 152 to an offset bracket 154 which is welded or otherwise secured to the vertical torque rod 144 adjacent the passenger side of the seat. Upon extension and retraction of the screw jack, the vertical torque rod 144 will be moved forwardly and rearwardly relative to the seat. Since the ends of the torque rod are secured to brackets 28 which are pivoted at 30 to bracket 20 movement of the vertical torque rod 144 forwardly and rearwardly of the seat will result in swinging movement of plates 28 about pivots 30.

As previously described, link 56 pivotally interconnects plate 28 and plate 24 on each side of the seat so that swinging movement of plate 28 in a particular direction relative to its pivot 30 will result in swinging movement of plate 24 in the same direction about its pivot 26. Since the plates are pivotally connected to the seat support bracket 32 which supports the track mechanism and seat 10, swinging movement of plates 24 and 28 about their pivots 26 and 30 results in vertical movement of the seat relative to the floor pan. Thus, clockwise movement of each of the plates about its pivot as the vertical torque rod 144 is moved rearwardly upon extension of the screw jack 146 will result in both sides of the seat being raised. Likewise, movement of plates 24 and 28 counterclockwise about their pivots as the vertical torque rod is moved forwardly upon retraction of screw jack 146 will result in the seat being lowered. Thus, the seat adjuster mechanism of this invention provides for vertical adjustment of the vehicle seat relative to the floor pan.

Referring now to Figures 1, 2, and 4 of the drawings, a horizontal torque rod 156 spans seat 10 transversely thereof and has the ends thereof welded or otherwise secured to the upper ends of brackets 50. A motor driven screw jack 158 has one end thereof pivoted at 160 to an offset bracket 162 secured to the vehicle floor pan and the other end thereof pivoted at 164 to an offset bracket 166 secured to torque rod 156. Thus, retraction and extension of the screw jack 158 will result in forward and rearward movement of torque rod 156 relative to the vehicle seat. Since the torque rod is rigidly secured to brackets 50 at either end of the seat, forward movement of torque rod 156 upon extension of screw jack 158 will result in counterclockwise movement of brackets 50 about their pivotal supports 38 and rearward movement of torque rod 156 upon retraction of screw jack 158 will result in clockwise movement of brackets 50 about their pivotal supports 38.

The only connection between brackets 50 and the vehicle seat is by means of links 110 and 122 and plate 130, and these members act as push and pull members upon swinging movement of brackets 50 to move the seat forwardly and rearwardly as the upper track member 66 slides on the lower track member 62. Since link 110 is connected to stud 120 of bracket 50 by means of slot 112 it is obvious that link 110 can only act as a pull member in order to move the seat forwardly upon swinging movement of bracket 50 in a counterclockwise direction about pivot 38. In the normal position of link 110 as shown in Figure 2 of the drawings, the forward end of slot 112 is in engagement with stud 120 so as to pull the seat forwardly upon swinging movement of bracket 50. If link 110 constituted the only connection between bracket 50 and the base frame 14, it is obvious that the seat frame could not be moved rearwardly since upon swinging movement of bracket 50 in a clockwise direction stud 120 would merely slide in slot 112 without imparting movement to the seat.

Since the connection between link 122 and plate 130 is by means of stud 134 and slot 135 these members can only act as a push member but not as a pull member. In the normal position of link 122 and plate 130 as shown in Figure 2, stud 134 of the plate is positioned in engagement with the forward end of slot 135. Thus, upon swinging movement of bracket 50 in a clockwise direction, engagement of the stud with the end of the slot will cause both members to be shifted rearwardly to move the base frame 14 rearwardly as the upper track member 66 slides on the lower track member 62. If link 122 and plate 130 acted as a pull member then it is obvious that upon swinging movement of plate 50 in a counterclockwise direction about pivot 38, stud 134 would slide in slot 135 until the stud reached the rear end of the slot before any movement would be imparted to the base frame 14. The force imparted to link 110 by stud 120 is along the center line of the link. Since stud 134 is positioned above a line through the centers of pins 120 and 114 pushing movement of stud 120 against link 122 to move the seat rearwardly will not cause folding movement of link 122 and plate 130.

Thus, horizontal movement of the base frame 14 relative to its support on the vehicle floor pan is controlled by pulling movement of stud 120 on slot 112 of link 110 and pushing movement of the stud on link 122 and plate 130. As will now be described, these members not only operate as part of the horizontal adjusting means for the seat but also operate as part of the easy entrance feature of the seat.

Referring now to Figures 1 and 2 of the drawings, each of the seat back frames 18 includes outboard depending arm members 170 and inboard depending arm members 172 which are pivoted at 174 to a bracket 176 secured to the base frame 14. The pivotal supports of the outboard arms 170 are spaced forwardly of pivotal supports 174, as will be presently described, so that each of the seat backs is tiltable relative to the base frame about an axis extending across the rear corner portion of the seat.

Referring now particularly to Figures 2 and 3 of the drawings, housing 118 includes an arcuate portion 178 which houses a stub shaft 180. Flanges 183 of housing 118 are secured to flanges 82 of bracket 80 and flanges 84 of the seat frame channel side member by bolts 86. An arm 182 is rigidly secured to the outboard end of shaft 180 and provided with a laterally outwardly extending stud 184 which is rigidly secured to arm 182 by peening over the inner end 186 of the stud. The end portion of each of the outboard arms 170 is apertured at 188 and rotatably mounted on the outboard end of shaft 180. A nylon washer 190 is provided between arm 170 and arm 182 and after assembly of arm 170 on stud 180, it is secured in place by means of a retaining ring 192. Arm 170 also includes an aperture 194 which receives stud 184 to secure arm 170 to arm 182 for rotation therewith. Thus, upon forward swinging movement of either of the seat backs, arm 170 will rotate stub shaft 180 by means of stud 184 and arm 182 which is rigidly secured to the shaft.

The inboard end of shaft 180 has rigidly secured thereto an arcuate arm 198 provided with a pair of spaced laterally outwardly extending studs 200 and 202 which are rigidly secured to arm 198. The lower stud 202 is adapted to engage a flange portion 204 of bracket 206 which is welded or otherwise secured to a laterally upwardly extending flange 208 of bracket 20. Stud 200 is adapted to fit within a notch 210 provided in the lower edge of plate 130 in the normal upright position of the seat back. Thus, in this position of the seat back, the seat can be adjusted both horizontally and vertically as previously described without any operation of the easy entrance feature of the seat.

Referring now particularly to Figures 2 and 5 of the drawings, the operation of the easy entrance feature will now be described. Assuming that the front seat passenger desires to shift his side of the seat forwardly to a temporary displaced position in order to provide entrance room for a rear seat passenger, the particular seat back on that side of the seat is tilted forwardly about its inboard pivot 174 and its outboard pivot defined by stub shaft 180. Upon forward tilting of the seat back, stub shaft 180 will be rotated in a counterclockwise direction as viewed in Figures 2 and 5 to swing arm 198 counterclockwise from its position of Figure 2 to a position wherein stud 202 engages flange 204 of bracket 206. As arm 198 swings downwardly and rearwardly stud 200 will engage the lower wall 212 of notch 210 to swing plate 130 in a counterclockwise direction about stud 114 and link 122 in a clockwise direction about stud 120 as stud 134 is shifted downwardly from its over center position with respect to a line through pins 114 and 120 to a position below this line. Since the end of link 122 which is secured to plate 130 is slotted at 135 this folding movement of the link and plate 130 may be had without imparting any lateral thrust to stud 120 of bracket 50.

When link 122 and plate 130 have been moved to a partially folded position and stud 202 has been moved into engagement with flange 204 of bracket 206, further tilting movement of the seat back causes the outboard arm 170 of the seat back to act as a lever and flange 204 to act as a fulcrum so that the particular side of the seat will be moved forwardly to a temporary horizontally displaced position as shown in Figure 5 as the upper track member 66 slides on the lower track member 62. As the seat moves forwardly to this position stud 114 shifts link 110 forwardly as slot 112 of the link slides on stud 120 and also moves link 122 and plate 130 to a folded position, as shown in Figure 5. After entrance or exit of the rear seat passenger the particular seat back is then returned to its normal upright position.

When the seat back is returned to its normal upright position, arm 198 is moved clockwise with shaft 180 and stud 200 engages the upper edge 214 of notch 210 to force plate 130 clockwise about stud 114 and cause stud 114 and the base frame to be shifted rearwardly as plate 130 and link 122 return to their position shown in Figure 2 and link 110 moves rearwardly as slot 112 slides relative to stud 120. Thus, the seat will return to its initial starting position.

As previously described each channel side member 74 of base frame 14 is pivotally secured intermediate its ends to a respective upper track member 66 by means of stud 88 and the channel side members are also slidably supported on the upper track member adjacent the rear and front ends thereof by means of nylon pads 98 and 106, respectively. Thus, each side of base frame 14 is swingable to a limited degree about its respective pivot 88. Upon forward shifting movement of one side of the seat frame to a temporary horizontally displaced position the seat frame will swing about its pivot 88 on each of the upper track members as the one track member on the side of the seat which is moved forwardly slides relative to its lower track member. Since the base frame swings about both of the pivots the effective distance between the pivots is increased which requires that the spacing between each of the seat adjuster mechanisms also be slightly increased.

This slight increase in the spacing of the seat adjuster mechanisms is accomplished by some play between the upper and lower track members, some movement between plates 24 and 28 and their pivotal supports on bracket 20, and some movement of brackets 50 toward the smaller diameter end of the tapered portions 40 of studs 38. Since the effective increase in the spacing between pivots 88 is very slight, the increase in distance is easily taken up at each of the above pivots.

As will be hereinafter described, it is possible to provide only one side of the seat with the easy entrance feature. In such an arrangement, the one pivot 88 on the side of the seat not having the easy entrance feature is displaced slightly forwardly of the other pivot 88 on the side of the seat having the easy entrance feature to decrease the amount of play taken up at the various pivotal connections by decreasing the effective arc of swinging of the other pivot 88 relative to the one pivot 88 as the other upper track member 66 moves forwardly relative to its lower track member 62.

When it is desired to shift the entire seat forwardly to a temporary displaced position, both of the seat backs are tilted forwardly and the operation of the easy entrance feature of this invention remains the same. However, there is no swinging movement of the base frame 14 about either pivot 88 since both of the upper track members 66 slide forwardly on their respective lower track members 62.

In the particular arrangement shown in the drawings, both sides of the base frame are provided with the easy entrance feature allowing either side of the seat to be temporarily displaced upon tilting movement of one of the seat backs or allowing the entire seat to be temporarily displaced upon forward tilting movement of both of the seat backs. If desired, the easy entrance feature may be applied to one side of the seat, and in such a construction the stud 120 of bracket 50 on the other side of the seat and stud 114 on the other side of the seat frame are merely connected by a link which is pivoted on both members.

Referring now to Figures 7 and 8 of the drawings, a clutch arrangement is shown which may be provided between the outboard arm 170 of the seat back frame and shaft 180. In the arrangement shown in Figure 3 of the drawings, there is no clutch provided between these members, and if the base frame should engage an obstruction upon tilting movement of the seat back, arm 170 or shaft 180 may be bent or twisted if enough force is applied to the seat back. By providing a clutch between these members, bending or twisting of the arm and shaft is prevented upon the base frame engaging an obstruction.

Arm 182 is provided with a lug 220 which includes a vertical groove or notch 224. The arm is rigidly secured to shaft 180 as in the prior construction and arm 170 is rotatably journalled on shaft 180 with the nylon or other washer 190 provided between the arms. A coil spring 226 engages arm 170 and a flat washer 228 secured on shaft 180 by means of a retaining ring 230 to bias arm 170 into engagement with washer 190. The lower end of arm 170 is apertured at 232 and a lug 234 having a tapered rib 236 is mounted within the apertured portion of arm 170 by welding or in another suitable manner. In the normal position of arms 170 and 182, spring 226 biases arm 170 inboard with respect to the seat so that the tapered rib 236 of lug 234 fits within groove 224 to establish an operative connection between arm 170 and shaft 180. Upon tilting movement of the seat back, the entire seat operates in the same manner. However, should the seat strike an obstruction during its forward movement the resultant force imposed on arm 182 and shaft 180 will prevent rotation of these members by arm 170. The coil spring 226 will then be compressed as arm 170 is shifted outward of the body to declutch the arm from arm 182 as rib 236 of lug 234 is cammed outwardly of groove 224 of lug 220. This will prevent further forward movement of the seat against the obstruction so as not to bend or twist the easy entrance mechanism.

Although the seat shown is both horizontally and vertically adjustable it is obvious that the easy entrance feature of this invention may be applied with equal success to a seat having horizontal movement only. In such an instance the seat supporting bracket 32 is rigidly secured to the vehicle floor pan and each of the brackets 50 is pivotally mounted on bracket 32 in the same manner as previously described.

Thus, this invention provides a front seat which is both horizontally and vertically adjustable and which also includes an easy entrance feature to provide for temporary horizontal displacement of either the entire seat or one side thereof in order to facilitate entrance and exit of rear seat passengers. The easy entrance feature of this invention is of relatively simple construction and can be applied to existing seat adjuster mechanisms without extensive modification. Since the easy entrance feature forms part of the seat adjuster mechanism, fewer parts are required which results in a lower manufacturing cost and ease of maintenance.

While a specific embodiment of this invention has been shown and described, various changes and modifications may be made within the scope and spirit of the invention.

We claim:

1. In a vehicle seat, a seat frame including a base portion and a back portion supported on the base portion for tilting movement relative thereto, linear guide means operatively secured to said seat frame for guiding linear movement thereof, fixed abutment means on said vehicle engageable by said back portion upon forward tilting movement thereof to move said seat frame to a temporary displaced position relative to said guide means, operating means for moving said seat linearly along said guide means, and linkage means interconnecting said operating means and said seat frame for linear movement thereof upon actuation of said operating means, said linkage means being movable to an inoperative position upon forward tilting movement of said seat back portion to allow movement of said seat frame to said temporary displaced position relative to said guide means.

2. In a vehicle seat, a seat frame including a base portion and a normally upright back portion supported on the base portion for tilting movement relative thereto, linear guide means operatively secured to said seat frame for guiding linear movement thereof, fixed abutment means on said vehicle engageable by said back portion upon forward tilting movement thereof to move said seat frame to a temporary displaced position relative to said guide means, operating means for moving said seat linearly along said guide means, and linkage means interconnecting said operating means and said seat frame for linear movement thereof upon actuation of said operating means, said linkage means being movable to an inoperative position by forward tilting movement of said back portion to allow movement of said seat frame to said temporary displaced position relative to said guide means, return of said back portion to said normally upright position moving said seat frame to a normal position and said linkage means to an operative position.

3. In a vehicle seat, a seat frame including a base portion and a back portion supported on the base portion for tilting movement relative thereto, linear guide means operatively secured to said seat frame for guiding linear movement thereof, fixed abutment means on said vehicle engageable by said back portion upon forward tilting movement thereof to move said seat frame to a temporary displaced position relative to said guide means, operating means for moving said seat linearly along said guide means, and linkage means interconnecting said operating means and said seat frame for linear movement thereof upon actuation of said operating means, said linkage means including foldable linkage means normally located in an operative substantially aligned position and being movable to a folded inoperative position upon forward tilting movement of said back portion to allow movement of said seat frame to said temporary displaced position relative to said guide means.

4. In a vehicle seat, a seat frame including a base portion and a normally upright back portion supported on the base portion for tilting movement relative thereto, linear guide means operatively secured to said seat frame for guiding linear movement thereof, fixed abutment means on said vehicle engageable by said back portion upon forward tilting movement thereof to move said seat frame to a temporary displaced position relative to said guide means, operating means for moving said seat frame linearly along said guide means, and linkage means interconnecting said operating means and said seat frame for linear movement thereof upon actuation of said operating means, said linkage means including foldable linkage means normally located in an operative substantially aligned position and being movable to a folded inoperative position upon forward tilting movement of said back portion to allow movement of said seat frame to said temporary displaced position relative to said guide means, return of said back portion to said normally upright position moving said seat frame to a normal position and moving said linkage means to said normal operative aligned position.

5. In a vehicle seat, a seat frame including a base portion and a normally upright back portion supported on the base portion for tilting movement relative thereto, linear guide means operatively secured to said seat frame for guiding linear movement thereof, fixed abutment means on said vehicle engageable by said back portion upon forward tilting movement thereof to move said seat frame to a temporary displaced position relative to said guide means, operating means for moving said seat frame linearly along said guide means, and linkage means interconnecting said operating means and said seat frame for linear movement thereof upon actuation of said operating means, said linkage means including foldable linkage means normally located in an operative substantially aligned position and being engageable by said back portion upon forward tilting movement thereof for movement to a folded inoperative position to allow movement of said seat frame to said temporary displaced position relative to said guide means.

6. In a vehicle seat, a seat frame including a base portion and a normally upright back portion supported on the base portion for tilting movement relative thereto, linear guide means operatively secured to said seat frame for guiding linear movement thereof, fixed abutment means on said vehicle engageable by said back portion upon forward tilting movement thereof to move said seat frame to a temporary displaced position relative to said guide means, operating means for moving said seat frame linearly along said guide means, and linkage means interconnecting said operating means and said seat frame for linear movement thereof upon actuation of said operating means, said linkage means including foldable linkage means normally located in an operative substantially aligned position in engagement with said back portion and being movable to a folded inoperative position upon forward tilting movement of said back portion to allow movement of said seat frame to said temporary displaced position relative to said guide means, return of said back portion to the normally upright position, returning said linkage means to said normal operative aligned position and moving said seat frame to a normal position through action of said linkage means.

7. In a vehicle seat, a seat frame including a base portion and a back portion supported on the base portion for tilting movement relative thereto, linear guide means operatively secured to said seat frame for guiding linear movement thereof, operating means for moving said seat frame linearly along said guide means, means interconnecting said operating means and said seat frame for linear movement thereof upon actuation of said operating means, said interconnecting means having an operative position preventing displacement of said seat frame relative to said operating means and an inoperative position allowing displacement of said seat frame relative to said operating means, and means operative upon forward tilting movement of said back portion for moving said interconnecting means to said inoperative position to allow movement of said seat frame to a temporary displaced position relative to said operating means.

8. In a vehicle seat, a seat frame including a base portion and a back portion supported on the base portion for tilting movement relative thereto, linear guide means operatively secured to said seat frame for guiding linear movement thereof, operating means for moving said seat frame linearly along said guide means, first and second linkage means interconnecting said operating means and said seat frame for linear movement thereof upon actuation of said operating means, said first linkage means having an operative position to allow movement of said seat frame in one direction relative to said guide means upon actuation of said operating means and said second linkage means having an operative position to allow movement of said seat frame in an opposite direction relative to said guide means upon actuation of said operating means, said first and second linkage means preventing displacement of said frame relative to said operating means in said operative positions thereof and having inoperative positions allowing displacement of said seat frame relative to said operating means, and means operative upon forward tilting movement of said back portion relative to said base portion for moving said first and second linkage means to said inoperative positions thereof to allow movement of said seat frame to a temporarily displaced position relative to said operating means.

References Cited in the file of this patent

UNITED STATES PATENTS

| | | |
|---|---|---|
| 2,189,396 | Greig | Feb. 6, 1940 |
| 2,737,229 | Semar | Mar. 6, 1956 |